United States Patent

[11] 3,584,945

| [72] | Inventor | Jon R. Berry |
| | | Lutherville, Md. |
| [21] | Appl. No. | 806,225 |
| [22] | Filed | Mar. 11, 1969 |
| [45] | Patented | June 15, 1971 |
| [73] | Assignee | The United States of America as represented by the Secretary of the Navy |

[54] INFRA-RED GENERATOR AND MIXER
2 Claims, 1 Drawing Fig.

| [52] | U.S. Cl. | 353/37 |
| [51] | Int. Cl. | G03b 21/28 |
| [50] | Field of Search | 353/30, 29, 37, 122, 42; 353/94 |

[56] References Cited
UNITED STATES PATENTS

| 2,442,240 | 5/1948 | Hooker et al. | 35/25 X |
| 3,134,297 | 5/1964 | Carlson et al. | 353/37 X |
| 3,355,588 | 11/1967 | Acloque | 353/29 |
| 3,481,667 | 12/1969 | Ferrer | 353/30 X |

FOREIGN PATENTS

| 954,129 | 6/1949 | France | 353/77 |

Primary Examiner—Harry N. Haroian
Attorneys—Joseph C. Warfield, John W. Pease and Harvey A. David ABSTRACT: Apparatus for generating and forming a converging infrared beam and mixing it with a diverging, visible image forming beam, the apparatus comprising in combination an infrared emitter, infrared collecting and imaging optical means, and mixer means comprising visible image forming beam reflecting mirror means disposed on the axis of the infrared beam and of a size permitting the infrared beam to pass around the mixer means.

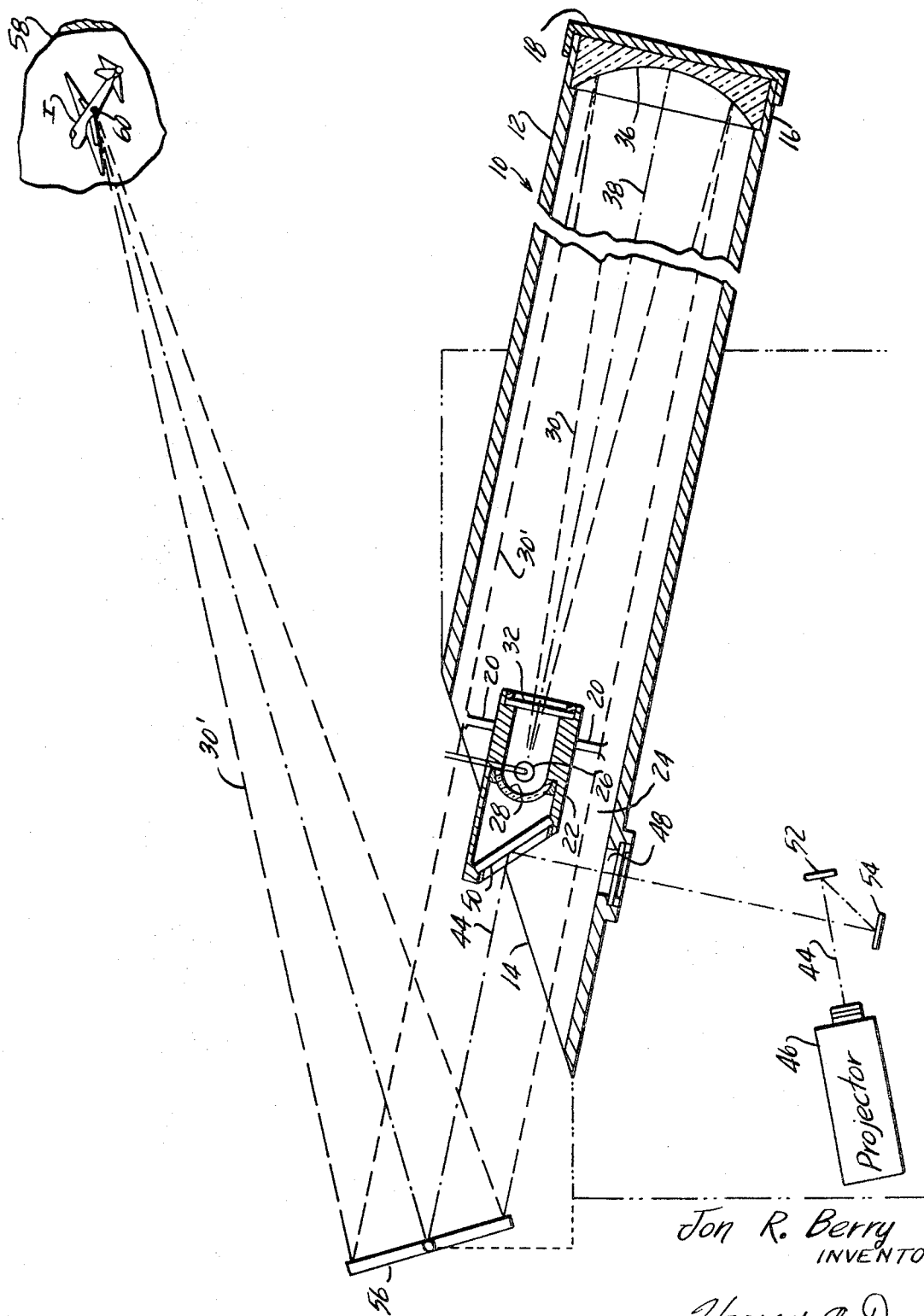

3,584,945

INFRA-RED GENERATOR AND MIXER

BACKGROUND OF THE INVENTION

This invention relates to training devices and more particularly to apparatus useful in training personnel in the aiming of a shoulder held antiaircraft weapon. The type of weapon concerned launches a heat of infrared seeking missile which is effective against low flying aircraft. Proper aiming of the weapon requires practice in target acquisition and tracking, which skills involve estimating proper lead and anticipation of the trajectory which the aircraft will follow. Because the procedures involved in readying and firing such a weapon are time dependent, that is to say each procedure must be done in a given sequence and within time limits established for example by the short effective life of a thermal battery element, adequate familiarization training is important. With respect to one typical weapon, the trainee must learn how to judge when to activate the weapon circuits, to position the target in the sight reticle very quickly, uncage a gyro and wait for it to stabilize, quickly introduce superelevation and lead angles, squeeze the trigger at the appropriate moment, and hold steady on the target point for a predetermined minimum time after firing.

Training devices for aiming and shooting various weapons have been available in the past utilizing projection systems for projecting a target image on a screen, which image the trainee sights on as his target. Such conventional target image projection systems, however, provide visual displays only. Electronic tracking or weapon sighting systems that utilize infrared radiations are insensitive to this type of display. Therefore, simultaneous evaluation of man and electronic system proficiency in terms of target acquisition and tracking in an infrared dependent shoulder fired weapon, for example, is not possible with a simple visual display. Copending U.S. Pat. application Ser. No. 796,693, assigned to the assignee hereof, describes a training apparatus wherein a projection system provides both a visual target image and a superimposed infrared signature on the target image.

BRIEF SUMMARY OF THE INVENTION

With the foregoing in mind, it is a primary object of this invention to provide a preferred form of infrared generator and mixer suitable for use in the training apparatus described in the aforementioned application.

Another object of this invention is the provision of an infrared generator and mixer which will project and superimpose an infrared signature on a projected visual image, which signature is realistic with respect to spectral energy distribution, spatial distribution, and gross energy levels, whereby adequate and meaningful training may be acquired in a training apparatus employing this invention.

The invention may be further summarized as residing in certain constructions, combinations, and arrangements of parts whereby the foregoing objects and advantages are achieved as well as others which will be apparent from the following specification when read in conjunction with the accompanying drawing forming a part of this specification.

IN THE DRAWING

The sole FIGURE is a diagrammatic illustration of an infrared generator and mixer embodying the present invention shown in association with visual target image projection system.

DESCRIPTION OF THE PREFERRED EMBODIMENT

In the form of the invention illustrated in the drawing and described hereinafter, there is provided an infrared generator and mixer, generally indicated at 10 and hereinafter referred to for convenience merely as the device 10. The device 10 comprises support means in the form of a tubular housing 12 having one end 14 open and the other end 16 closed as by a closure member 18.

Mounted internally of the housing 12 by spider means 20 is a generally tubular member 22. The member 22 is located concentrically in the housing and is of a size which will leave a substantial annular space 24 between the member and the housing. Within the member 22 is mounted an infrared emitting incandescent lamp 26. The lamp 26 is of the type having a transparent envelope formed of quartz or other infrared transparent material.

Associated with the lamp 26 is a concave reflector 28, preferably spherical, which forms the emitted infrared energy into a somewhat diverging beam 30 coaxially along the housing 12 toward the end 16 thereof. A filter 32 is mounted on the member 22 in the path of the beam 30 and serves to limit the infrared energy in the beam 30 therebeyond to wavelengths within predetermined limits.

Disposed at the end 16 of the housing 12 is an infrared collecting and imaging optical means in the form of concave reflector or mirror 36. The mirror 36, which is preferably parabolic in curvature and is of larger diameter than the member 22, is operative to redirect the energy of beam 30 in a return direction along the axis 38 of the housing 12 as a slightly converging beam 30'.

The converging beam 30' is of sufficient diameter that a substantial portion thereof passes through the annular space 24 around the member 22 and passes out the open end 14 of the housing 12.

The converging beam 30' is mixed with a diverging, visible image forming beam, represented by a dot-and-dash line 44, from a motion picture projector 46 forming part of a projection system such as that described in copending U.S. Pat. application Ser. No. 796,693. To this end, a window 48 is provided in the housing 12, and a plane reflector or mirror 50 is mounted on the member 22. In the present example, reflectors or mirrors 52, 54 redirect the visible image forming beam 44 from the projector 46 so that the beam 44 enters the housing 12 normal to the axis 38. The mirror 50 is disposed so as to cause the visible image forming beam 44 to emerge from the open end 14 of the housing 12 coaxially with the converging infrared beam 30'.

The coaxial beams 44 and 30' are directed by a gimballed mirror 56 onto a projection screen 58 where the beam 44 forms a visible image I and the beam 30' forms an infrared image in the form of a spot 60 superimposed on the image I. The gimballed mirror 56 is movable by drive means described in the aforementioned copending application to cause the image I and the superimposed infrared spot 60 to traverse the screen 58 along a programmed trajectory.

What I claim is:

1. In a projection system including a screen for displaying a projected visible image and a projector for providing a divergent, visible image forming beam, an infrared generator and mixer comprising:
    support means;
    infrared emitter means mounted on said support means and operative to emit infrared energy;
    infrared collecting and imaging optical means disposed to collect infrared energy emitted from said emitter means and to form said energy into a convergent beam so as to form an infrared image spot on said screen;
    mixer means comprising plane reflector means operative to direct said visible image beam along a colinear path with said convergent beam of infrared energy;
    said infrared emitter means comprising an incandescent lamp having an envelope of infrared material, and a first concave reflector mounted adjacent said lamp and operative to direct a divergent beam of infrared energy to said collecting and imaging optical means; and
    said collecting and imaging optical means comprising a second concave reflector mounted in said support means coaxial with said first concave reflector, said second concave reflector being larger in diameter than said first concave reflector and operative to redirect said infrared energy as a convergent beam.

2. An infrared generator and mixer as defined in claim 1, and wherein:

said support means comprises a tubular housing which is open at one end;
said second concave reflector being mounted in the other end of said housing;
said emitter means and said mixer means being mounted in a tubular element which is disposed coaxially of said tubular housing and between said ends thereof;
said housing and said tubular element defining an annular space therebetween; and
said second concave reflector being operative to direct a substantial portion of said convergent beam through said annular space.